United States Patent
Fan et al.

(10) Patent No.: US 7,945,697 B2
(45) Date of Patent: May 17, 2011

(54) SYSTEM AND METHOD FOR OFFERING A FIXED INTERNET PROTOCOL ADDRESS TO A CLIENT DEVICE

(75) Inventors: Huai-Chih Fan, Taipei Hsien (TW); Yew-Min Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 210 days.

(21) Appl. No.: 12/274,357

(22) Filed: Nov. 20, 2008

(65) Prior Publication Data
US 2009/0287847 A1    Nov. 19, 2009

(30) Foreign Application Priority Data
May 16, 2008    (CN) .......................... 2008 1 0301595

(51) Int. Cl.
*G06F 13/00* (2006.01)
(52) U.S. Cl. .................. 709/245; 709/226; 709/224
(58) Field of Classification Search .............. 709/245, 709/224, 223, 226–228
See application file for complete search history.

(56) References Cited

U.S. PATENT DOCUMENTS

| | | | | |
|---|---|---|---|---|
| 6,957,276 | B1 * | 10/2005 | Bahl | 709/245 |
| 7,587,518 | B2 * | 9/2009 | Bahl | 709/245 |
| 2006/0047791 | A1 * | 3/2006 | Bahl | 709/220 |
| 2007/0230463 | A1 * | 10/2007 | Shima et al. | 370/389 |
| 2008/0059623 | A1 * | 3/2008 | Yang et al. | 709/223 |

* cited by examiner

*Primary Examiner* — Kenneth R Coulter
(74) *Attorney, Agent, or Firm* — Frank R. Niranjan

(57) ABSTRACT

A method for offering a fixed Internet protocol (IP) address to a client device is provided. The method includes recording a client device ID and an IP address assigned to the client device by a dynamic host configuration protocol (DHCP) server. The method further includes sending a renewing request periodically to the DHCP server to renew the IP address in response to the determination that the client device is not powered on. Furthermore, the method includes sending an offering message comprising the client device ID and the IP address to the client device until the client device accepts the offering message in response to the determination that the client device is powered on.

12 Claims, 3 Drawing Sheets

SYSTEM AND METHOD FOR OFFERING A FIXED INTERNET PROTOCOL ADDRESS TO A CLIENT DEVICE

BACKGROUND OF THE INVENTION

1. Field of the Invention

Embodiments of the present disclosure relate to communication methods, and particularly to a system and method for offering a fixed Internet protocol (IP) address to a client device.

2. Description of Related Art

Most machines on the Internet use the Transmission Control Protocol/Internet Protocol (TCP/IP) to send data to other machines on the Internet. To transmit data from a source address to a destination address, the Internet protocol (IP) uses an IP address. Most machines such as computers must have an IP address to communicate with other machines on the Internet.

Usually, a dynamic host configuration protocol (DHCP) server is used for assigning IP addresses to the machines. DHCP server may provide three modes for allocating IP addresses. The modes are dynamic allocation, automatic allocation and static allocation. The best-known mode is dynamic allocation. When received a request from a client device on the Internet, the DHCP server dynamically assigns an IP address, and offers the client device with the IP address. However, if a client device is powered off, the DHCP server will allocate the IP address to another client device. Then, next time when the client device is powered on again, the DHCP server will dynamically may assign a new IP address to the client device. As a result, the IP address of the client device may frequently change.

Therefore, what is needed is a system and method for offering a fixed IP address to a client device.

DETAILED DESCRIPTION OF CERTAIN INVENTIVE EMBODIMENTS

All of the processes described below may be embodied in, and fully automated via, function modules executed by one or more general purpose processors. Some or all of the methods may alternatively be embodied in specialized hardware. The code modules may be stored in any type of computer-readable medium or other computer storage device.

Figure 1:
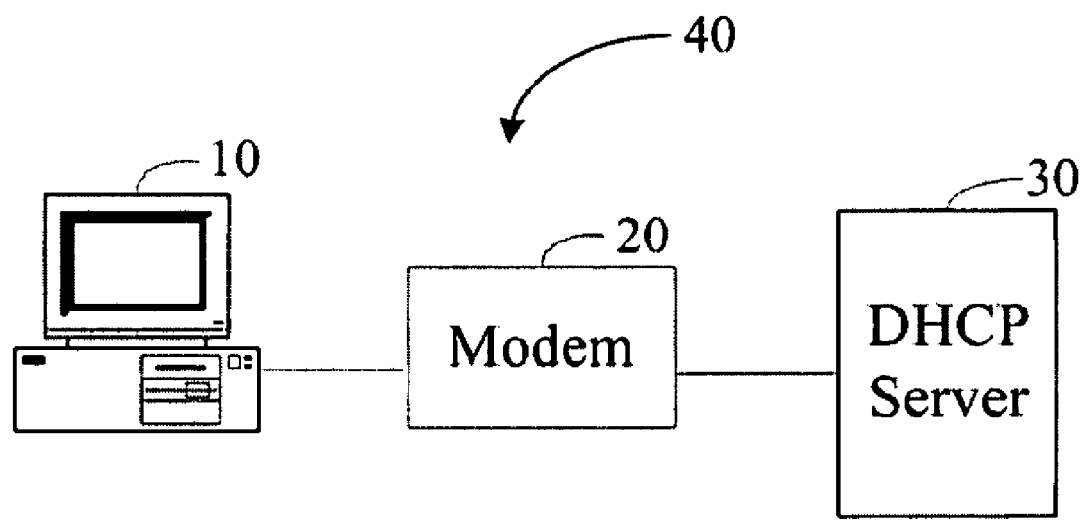
FIG. 1 is a block diagram of one embodiment of a system for offering a fixed IP address to a client device.

FIG. 1 is a block diagram of one embodiment of a system 40 for offering a fixed Internet address (IP) address to a client device 10. In this embodiment, the system 40 includes one or more client devices 10 (only one shown in FIG. 1), a modem 20, and a dynamic host configuration protocol (DHCP) server 30. The modem 20 connects to the client device 10 and the DHCP server 30. The DHCP server 30 is configured for dynamically assigning an IP address to each of the client devices 10. Depending on the embodiment, the client device 10 may be a personal computer (PC), a network server, a hypertext transfer protocol (HTTP) server, a file transfer protocol (FTP) server, or other appropriate data-processing electronic device.

The modem 20 is configured for exchanging data between the client device 10 and the DHCP server 30. Depending on the embodiment, the modem 20 may be an asymmetric or a symmetric digital subscriber line (ADSL or SDSL) modem, a cable modem or other appropriate device with modulating and demodulating data functions.

Figure 2:
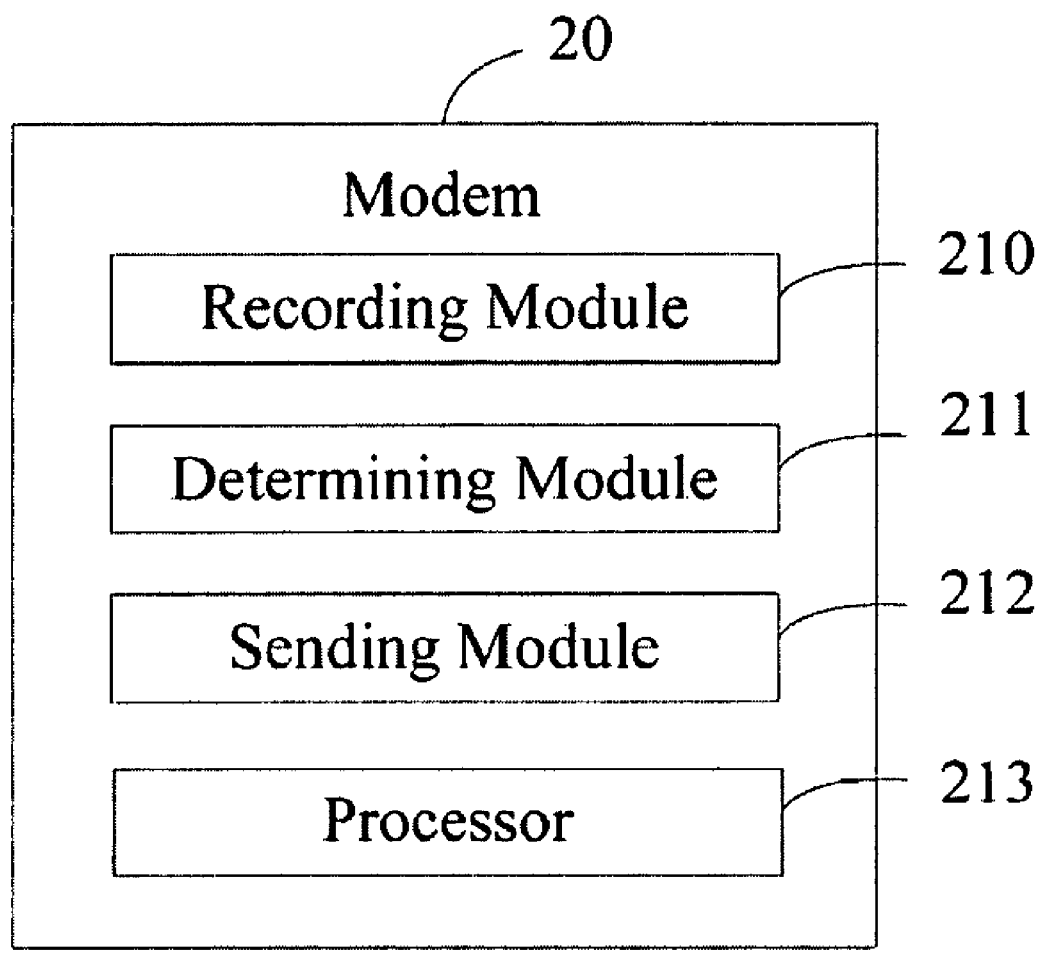
FIG. 2 is a block diagram of one embodiment of a modem of FIG. 1.

FIG. 2 is a block diagram of one embodiment of the modem 20 of FIG. 1. The modem 20 includes a recording module 210, a determining module 211 and a sending module 212. The modules 210, 211, 212 may be used to execute one or more operations for the modem 20. Additionally, the modem 20 may comprise one or more specialized or general purpose processors, such as a processor 213, for executing the modules 210, 211, 212.

The recording module 10 is configured for recording a client device ID and an assigned IP address assigned to the client device 10 by the DHCP server 30. In one embodiment, the client device ID is a media access control (MAC) address of the client device 10.

The determining module 211 is configured for determining if the client device 10 is powered on.

The sending module 212 is further configured for periodically sending a renewing request to the DHCP server 30 to renew the IP address, if the client device 10 is not powered on.

The sending module 212 is further configured for periodically sending an offering message comprising the client device ID and the IP address to the client device 10 until the client device 10 accepts the offering message, if the client device 10 is powered on. In one embodiment, the packets contain the MAC address of the client device 10, followed by the IP address that the DHCP server 30 is offering, and the duration of the IP address.

Figure 3:
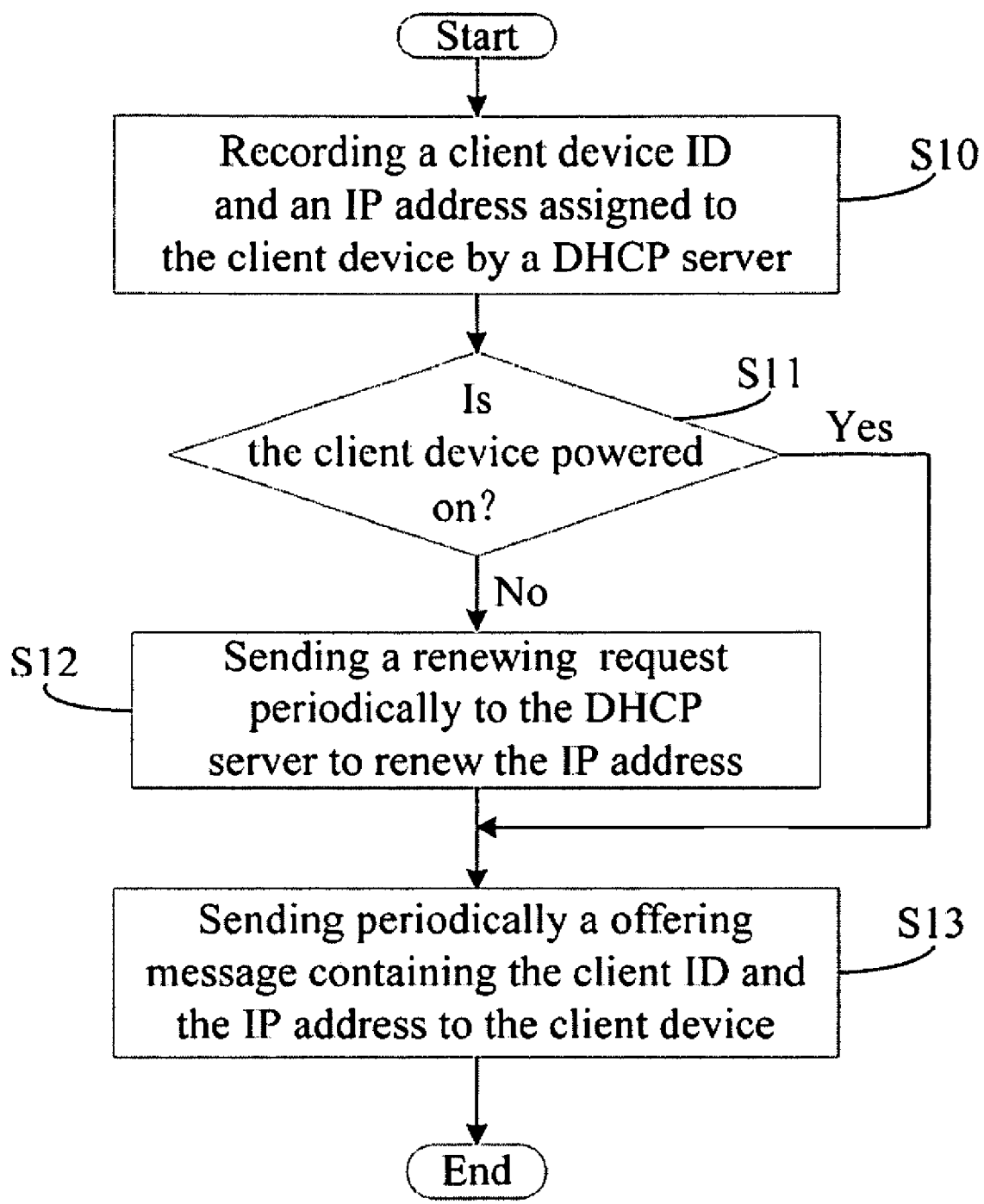
FIG. 3 is a flowchart of one embodiment of a method for offering a fixed IP address to a client device.

FIG. 3 is a flowchart of one embodiment of a method for offering a fixed Internet protocol (IP) address to a client device. Depending on the embodiment, additional blocks may be added, others removed, and the ordering of the blocks may be changed.

In block S10, the recording module 10 records a client device ID and an IP address assigned to the client device 10 by the DHCP server 30. In one embodiment, the client device ID is a media access control (MAC) address of the client device 10.

In block S11, the determining module 211 determines if the client device 10 is powered on.

If the determining module 211 determines the client device 10 is not powered on, the procedure returns to block S12. Otherwise, if the determining module 211 determines the client device 10 is powered on, the procedure returns to block S13.

In block S12, the sending module 212 periodically sends a renewing request to the DHCP server 30 to renew the IP address.

In block S13, the sending module 212 periodically sends an offering message comprising the client device ID and the IP address to the client device 10 until the client device 10 accepts the offering message, if the client device 10 is powered on. As mentioned above, the offering message contains the MAC address of the client device 10, followed by the IP address offered by that the DHCP server 30, and the duration of the IP address. For example, assumption that the client device 10 is powered on again, the sending module 212 immediately sends the offering message to the client device 10, if the client device 10 accepts the message, then the sending module 212 stop sending the offering message. Otherwise, the sending module 212 resends the offering message to the client device 10.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for offering a fixed Internet protocol (IP) address to a client device, the system comprising:
   a recording module configured for recording a client device ID and an IP address assigned to the client device by a dynamic host configuration protocol (DHCP) server;
   a determining module configured for determining if the client device is powered on;
   a sending module configured for periodically sending a renewing request to the DHCP server to renew the recording IP address and make the recording IP address not be withdrawn by the DHCP server in response to the determination that the client device is not powered on;
   the sending module further configured for periodically sending an offering message comprising the recording client device ID and the recording IP address to the client device until the client device accepts the offering message in response to the determination that the client device is powered on, and making the client device use the recording IP address again; and
   at least one hardware processor for executing the recording module, the determining module and the sending module.

2. The system of claim 1, wherein the client device ID is a media access control (MAC) address of the client device.

3. The system of claim 1, wherein the offering message further comprises the duration of the IP address.

4. The system of claim 1, wherein the client device is selected from the group consisting of a personal computer (PC), a network server, a hypertext transfer protocol (HTTP) server, and a file transfer protocol (FTP) server.

5. A method, executing on hardware, for offering a fixed Internet protocol (IP) address to a client device, the method comprising:
   recording a client device ID and an IP address assigned to the client device by a dynamic host configuration protocol (DHCP) server;
   sending a renewing request periodically to the DHCP server to renew the recording IP address and make the recording IP address not be withdrawn by the DHCP server in response to the determination that the client device is not powered on; and
   sending an offering message comprising the recording client device ID and the recording IP address to the client device until the client device accepts the offering message in response to the determination that the client device is powered on, and making the client device use the recording IP address again.

6. The method of claim 5, wherein the client device ID is a media access control (MAC) address of the client device.

7. The method of claim 5, wherein the offering message further comprises the duration of the IP address.

8. The method of claim 5, wherein the client device is selected from the group consisting of a personal computer (PC), a network server, a hypertext transfer protocol (HTTP) server, and a file transfer protocol (FTP) server.

9. A non-transitory storage medium having stored thereon instructions that, when executed by a modem, causing the modem to perform a method for offering a fixed Internet protocol (IP) address to a client device, the method comprising:
   recording a client device ID and an IP address assigned to the client device by a dynamic host configuration protocol (DHCP) server;
   sending a renewing request periodically to the DHCP server to renew the recording IP address and make the recording IP address not be withdrawn by the DHCP server in response to the determination that the client device is not powered on; and
   sending an offering message comprising the recording client device ID and the recording IP address to the client device until the client device accepts the offering message in response to the determination that the client device is powered on, and making the client device use the recording IP address again.

10. The non-transitory storage medium of claim 9, wherein the client device ID is a media access control (MAC) address of the client device.

11. The non-transitory storage medium of claim 9, wherein the offering message further comprises the duration of the IP address.

12. The non-transitory storage medium of claim 9, wherein the client device is selected from the group consisting of a personal computer (PC), a network server, a hypertext transfer protocol (HTTP) server, and a file transfer protocol (FTP) server.

* * * * *